United States Patent [19]
Albrecht

[11] Patent Number: 5,448,436
[45] Date of Patent: Sep. 5, 1995

[54] DISK DRIVE WITH SHOCK-RESISTANT ROTARY ACTUATOR

[75] Inventor: Thomas R. Albrecht, San Jose, Calif.

[73] Assignee: International Business Machines Corporation, Armonk, N.Y.

[21] Appl. No.: 212,463

[22] Filed: Mar. 14, 1994

[51] Int. Cl.⁶ .................... G11B 5/54; G11B 21/22
[52] U.S. Cl. .................................................. 360/105
[58] Field of Search ............... 360/104, 105, 106, 109

[56] References Cited

U.S. PATENT DOCUMENTS

| | | | |
|---|---|---|---|
| 5,019,932 | 5/1991 | Iwata | 360/105 |
| 5,117,318 | 5/1992 | Immler et al. | 360/105 |
| 5,134,608 | 7/1992 | Strickler et al. | 369/215 |
| 5,189,576 | 2/1993 | Morehouse et al. | 360/105 |
| 5,296,986 | 3/1994 | Morehouse et al. | 360/106 |
| 5,313,354 | 5/1994 | Sampietro et al. | 360/105 |

Primary Examiner—Stuart S. Levy
Assistant Examiner—William J. Klimowicz
Attorney, Agent, or Firm—Thomas R. Berthold

[57] ABSTRACT

A magnetic recording disk drive includes a bidirectional rotary inertial lock to reliably lock the actuator in the parked position. The lock engages the actuator even in the presence of a rotational acceleration tending to drive the actuator into its crash stop. In the preferred embodiment, the rotary inertial lock includes a flexible latch arm that is also driven into a stop in the presence of the same acceleration, but rebounds to engage the actuator on its rebound from its crash stop.

10 Claims, 6 Drawing Sheets

PRIOR ART

FIG. 1

PRIOR ART

FIG. 2

PRIOR ART

DISK DRIVE WITH SHOCK-RESISTANT ROTARY ACTUATOR

TECHNICAL FIELD

This invention relates in general to data recording disk drives, and more particularly to magnetic recording rigid disk drives with rotary actuators that have means for locking the actuators when the drives are not operating.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a relatively fragile suspension that connects the slider to a rotary actuator. The slider is either biased toward the disk surface by a small spring force from the suspension, or is "self-loaded" to the disk surface by means of a "negative-pressure" air-bearing surface on the slider.

To improve the wear resistance of the disk, as well as to maintain consistent magnetic properties, it is desirable to make the disk surface as smooth as possible. However, a very smooth disk surface creates a problem known as "stiction". This means that after the slider has been in stationary contact with the disk for a period of time, the slider tends to resist translational movement or "stick" to the disk surface. Stiction is caused by a variety of factors, including static friction and adhesion forces between the disk and slider created by the lubricant on the disk. Stiction in a disk drive can result in damage to the head, disk, or suspension when the slider suddenly breaks free from the disk surface when disk rotation is initiated. In some disk drives, such as low-power disk drives used in laptop and notebook computers, the drive motor may simply be unable to initiate rotation or achieve operating speed because of the adhesion forces that cause stuck sliders or excessive drag.

To prevent the problem of stiction that occurs if the slider comes to rest on the disk surface, conventional disk drives park the actuator against one of its two "crash stops" so that the slider is maintained away from the data region of the disk when the drive is not operating. Contact start/stop (CSS) disk drives, i.e., those that operate with the slider in contact with the disk surface during start and stop operations, use a dedicated landing zone where the slider is parked when the drive is not operating. Typically, the landing zone is a specially textured nondata region near the inside diameter (ID) of the disk. In contrast to CSS disk drives, "load/unload" disk drives address the stiction problem by mechanically unloading the slider from the disk when the power is turned off, and then loading the slider back to the disk when the disk has reached a speed sufficient to generate the air bearing. The loading and unloading is typically done by means of a ramp that contacts the suspension when the actuator is moved away from the data region of the disk. The slider is thus parked off the disk surface with the suspension supported in a recess of the ramp.

A separate reason for parking the actuator when the disk drive is not operating is that the head, disk, or suspension can be damaged by a sudden external force that drives the slider onto the disk. This is especially likely in laptop computers.

In contrast to conventional air-beating disk drives, contact or near-contact disk drives have been proposed that place the head carrier in constant or occasional contact with the disk or a liquid film on the disk during read and write operations. Examples of these types of disk drives are described in IBM's U.S. Pat. No. 5,202,803 and published European application EP 367510; U.S. Pat. No. 5,097,368 assigned to Conner Peripherals; and U.S. Pat. No. 5,041,932 assigned to Censtor Corporation. These types of disk drives may also be of the type that park the actuator with the head carrier away from the data region of the disk when the drive is not operating.

Because of the adverse consequences if the head carrier contacts or impacts the data region of the disk, disk drives that park the actuator typically have some type of actuator lock to prevent the actuator from moving the carrier toward the data region of the disk in the event of an external shock. Passive magnetic or spring locks apply restraining forces that are overcome when the drive is turned on and the actuator is activated. Solenoid locks engage the actuator when power is off and release when a current pulse is applied. A rotary inertial lock, as described in U.S. Pat. No. 5,189,576 assigned to Integral Peripherals, locks the rotary actuator in the presence of an external force that causes the parked actuator to move away from its crash stop toward the data region of the disk. The passive locks are especially subject to failure in the presence of a sudden external force, the solenoid locks are unreliable, and the inertial rotary lock has been found to be inoperable in the presence of an external force that causes the parked actuator to move into its crash stop.

What is needed is a disk drive with a reliable lock for the parked rotary actuator that operates regardless of the direction of the external force.

SUMMARY OF THE INVENTION

The present invention is a disk drive that uses a bidirectional rotary inertial lock to reliably lock the actuator in the parked position. The lock engages the actuator even in the presence of a rotational acceleration tending to drive the actuator into the crash stop. In the preferred embodiment, the rotary inertial lock includes a flexible latch arm that is also driven into a stop in the presence of the same acceleration, but rebounds to engage the actuator on its rebound from its crash stop.

For a fuller understanding of the nature and advantages of the present invention, reference should be made to the following detailed description taken together with the accompanying drawings.

DETAILED DESCRIPTION OF THE INVENTION

PRIOR ART

Figure 1:
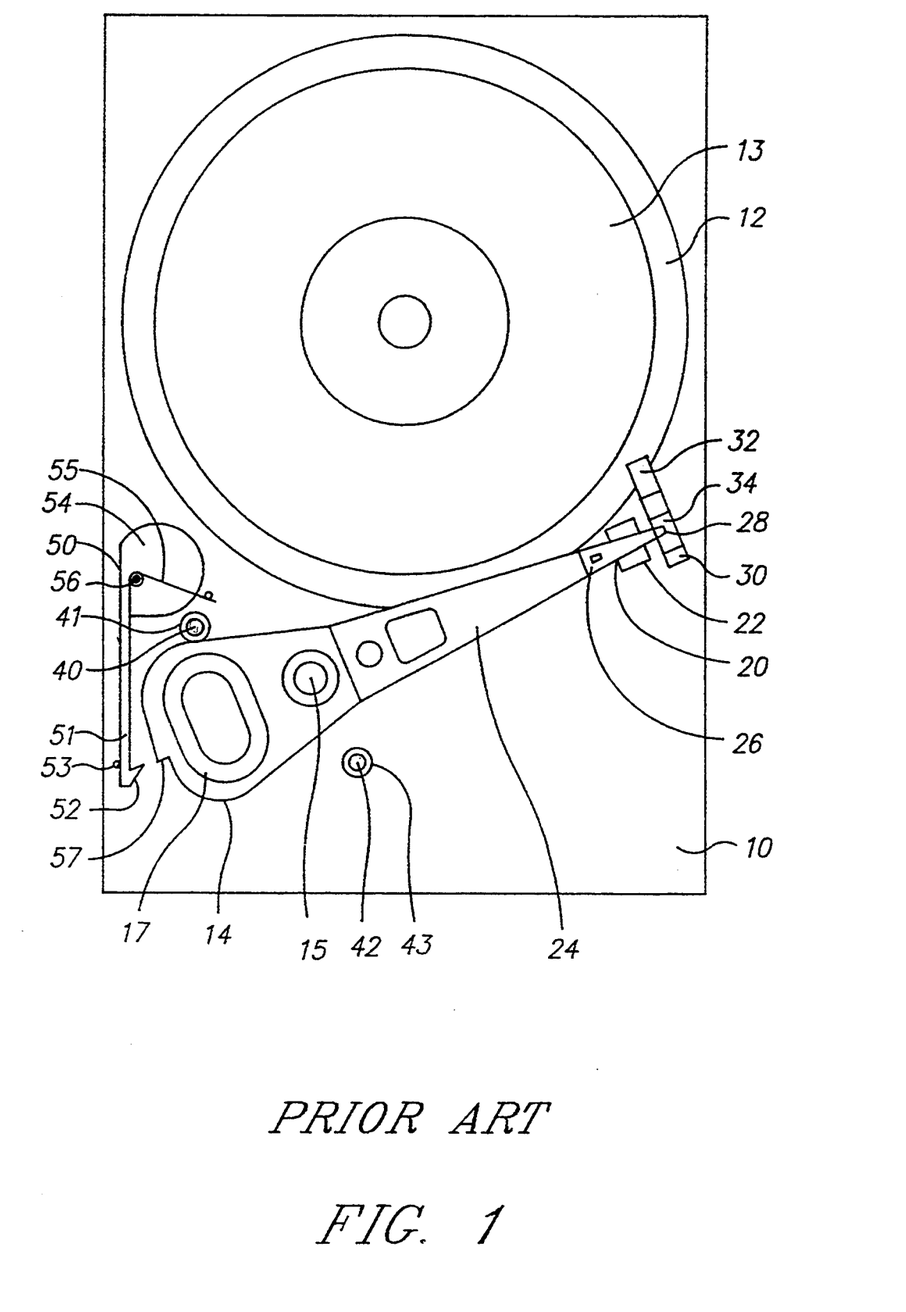
FIG. 1 is an illustration of a disk drive with a prior art rotary inertial lock in the open position.

Referring first to FIG. 1, there is illustrated a top view of the interior of a prior art disk drive with the housing cover removed. For ease of illustration and explanation, the disk drive depicted in FIG. 1 is shown as having a single recording head and associated disk surface, although conventional disk drives typically have multiple heads and disks. The disk drive comprises a housing base 10 to which are secured a disk drive or spindle motor with attached disk 12, a rotary actuator 14, a load/unload ramp 30, and a rotary inertial lock 50. The base 10 and a cover (not shown) provide a substantially sealed housing for the disk drive.

The disk 12 has a data region 13 and includes a thin film of conventional perfluoro-polyether (PFPE) lubricant on its surface.

The rotary actuator 14 rotates on a pivot 15 mounted to base 10. Actuator 14 is typically a balanced rotary voice coil motor (VCM) actuator having a coil 17 that moves through the fixed magnetic field of a magnet assembly (not shown) mounted to base 10. An outside diameter (OD) crash stop 40 and an inside diameter (ID) crash stop 42 are mounted to base 10 to limit the travel of rotary actuator 14. The crash stops may be rigid posts with elastomeric O-rings, such as O-rings 41, 43 on crash stops 40, 42, respectively. Alternatively, the crash stops my be rubber bumpers or resilient cantilever beams. The actuator 14 has on the end opposite coil 17 a rigid arm 24. A suspension 26 is attached to the end of actuator arm 24. The suspension 26 may be a conventional type of suspension such as the well-known Watrous suspension, as described in U.S. Pat. No. 4,167,765 assigned to IBM. The suspension 26 supports the head carrier or air-bearing slider 22 and includes a tab 28 that extends beyond the slider 22. A read/write head or transducer 20 is formed on the trailing end of slider 22. Transducer 20 may be an inductive read and write transducer or an inductive write transducer with a magnetoresistive (MR) read transducer formed by thin film deposition techniques as is known in the art.

A load/unload ramp 30 having a ramp portion 32 and a recess 34 is mounted to the base 10. Ramp 30 supports the suspension tab 28 in its recess 34 and thus serves as the parking location for actuator 14 when the disk drive is not operating. FIG. 1 illustrates the actuator 14 parked, i.e., suspension tab 28 residing in ramp recess 34 and the actuator 14 forced against the O-ring 41 of OD crash stop 40. If the disk drive were a CSS disk drive, then the actuator 14 would be parked against the O-ring 43 of ID crash stop 42 and the slider 22 would be at rest on a textured nondata landing zone at the ID region of the disk 12. A passive actuator lock or a solenoid lock would be used to keep the actuator 14 parked with the slider 22 at the landing zone.

A rotary inertial lock 50 is also mounted on base 10 and includes an arm 51 having a tip 52, a latch stop 53, a counterweight 54, and a torsion spring 55. The inertial lock 50 is a rigid body, rotationally balanced, that rotates on a pivot 56 mounted to base 10. Pivot 56 is parallel to pivot 15 of actuator 14. The torsion spring 55 (or other means) urges the arm 51 up against latch stop 53 to hold the lock in its open position, which allows free rotation by the actuator 14, as shown in FIG. 1.

Figure 2:
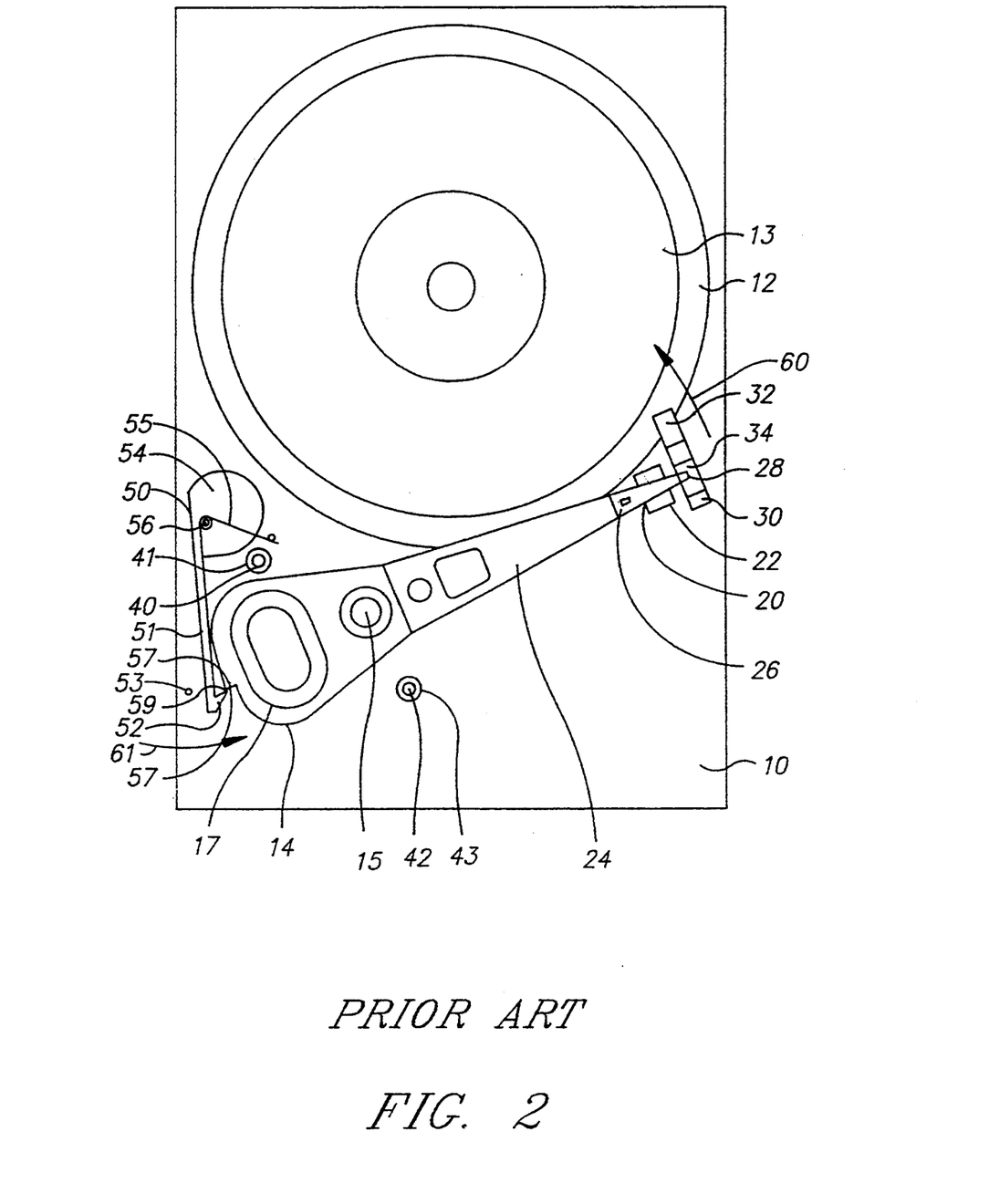
FIG. 2 is an illustration of a disk drive with a prior art rotary inertial lock in the locked position.

When the rotary lock is in the locked position (see FIG. 2), the tip 52 is engaged with a mating surface 57 on actuator 14, which prevents actuator 14 from moving the suspension tab 28 off the ramp recess 34. FIG. 2 shows the latch tip 52 and the actuator mating surface 57 at an imaginary engagement point 59, which is the intersection of the circular arcs formed by the tip 52 and mating surface 57. If the disk drive were a CSS disk drive, the rotary lock 50 would be designed to rotate in the opposite direction from that shown in FIG. 1 and would be located on the other side of actuator 14 near crash stop 42.

During read/write operations of the disk drive, the drive motor rotates the disk 12 at a constant speed, and the actuator 14 rotates about pivot 15 to move the slider 22 generally radially across the surface of the disk 12 so that the read/write transducer 20 may access different data tracks on the data region 13. The arm 51 of rotary lock 50 is biased against latch stop 53 by spring 55 so that actuator 14 is free to rotate about pivot 15. The suspension 26 provides a loading force to the slider 22 to urge it toward the surface of disk 12. The data detected from disk 12 by the transducer 20 is processed into a data readback signal by signal amplification and processing circuitry (not shown). When the disk drive is powered down, the actuator 14 is driven toward ramp 30 while the disk 12 is still rotating. The suspension tab 28 contacts the ramp portion 32, moves up the ramp portion 32 and off the disk 12, and comes to rest in ramp recess 34. At this time, the actuator 14 is parked and pressed against O-ring 41 of OD crash stop 40.

FIG. 2 shows how the conventional rotary inertial lock 50 works to keep the actuator in this parked position when the drive is not operating. When the drive undergoes a rotational acceleration in the clockwise direction (e.g., when the drive is accidentally dropped or subjected to sudden impact), all bodies inside the drive experience a torque in the direction indicated by arrow 60, i.e., counterclockwise relative to the drive. If no lock is present, the rotary actuator 14 may rotate away from OD crash stop 40 to move the suspension tab off the ramp 30 and allow the slider 22 to enter the data region 13 of the disk 12. As described above, this could damage the head, disk, or suspension, or allow the slider to come to rest on the disk, thereby presenting the stiction problem. However, the rotary inertial lock 50 also experiences the same torque as the actuator 14 and is also free to rotate in the same direction. By appropriate design of the lock 50, the arm 51 will then rotate about pivot 56 away from latch stop 53 (in the direction indicated by arrow 61) and reach the engagement point 59 before the mating surface 57. The rotating actuator 14 will thus be prevented from moving away from its parked location because, shortly after it begins to rotate, the mating surface 57 will intercept the latch tip 52 near the engagement point 59.

Figure 3:
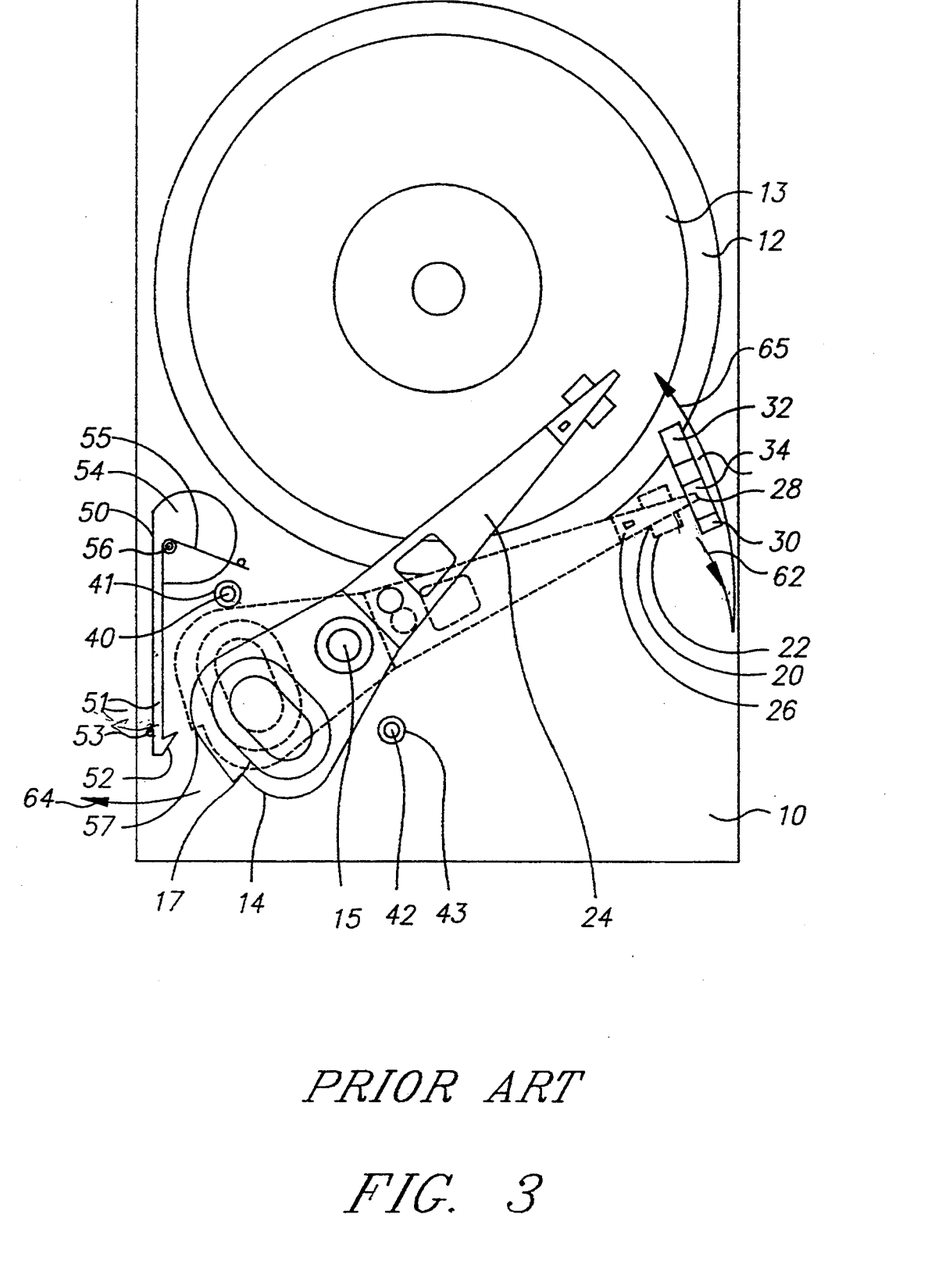
FIG. 3 is an illustration of a disk drive with a prior art rotary inertial lock showing the inability of the lock to lock the actuator when the actuator rebounds off its crash stop.

The prior art rotary latch 50 only functions if the external torque is in the direction tending to move actuator 14 away from OD crash stop 40. However, if the drive is subjected to an external torque that tends to force actuator 14 into crash stop 40 (i.e., the actuator 14 shown by dotted lines in FIG. 3 is rotated clockwise as shown by arrow 62), the latch arm 51 will be driven into latch stop 53 (in the direction indicated by arrow 64). The crash stop 40 has the elastic O-ring 41 which is designed to cushion impacts as the actuator 14 reaches the end of its allowed travel in the OD direction. The actuator 14 will bounce off the crash stop 40 and travel back in the direction of the disk 12, as shown by arrow 65. However, the rotary inertial lock 50, being essentially an inelastic system, will not work to engage the actuator 14. Thus, the actuator 14 can bounce onto the disk 12 with no response from lock 50. The acceleration caused by the external torque only serves to hold the latch arm 51 open, while the actuator 14 bounces off its crash stop 40 onto the disk 12.

PREFERRED EMBODIMENTS

Figure 4:
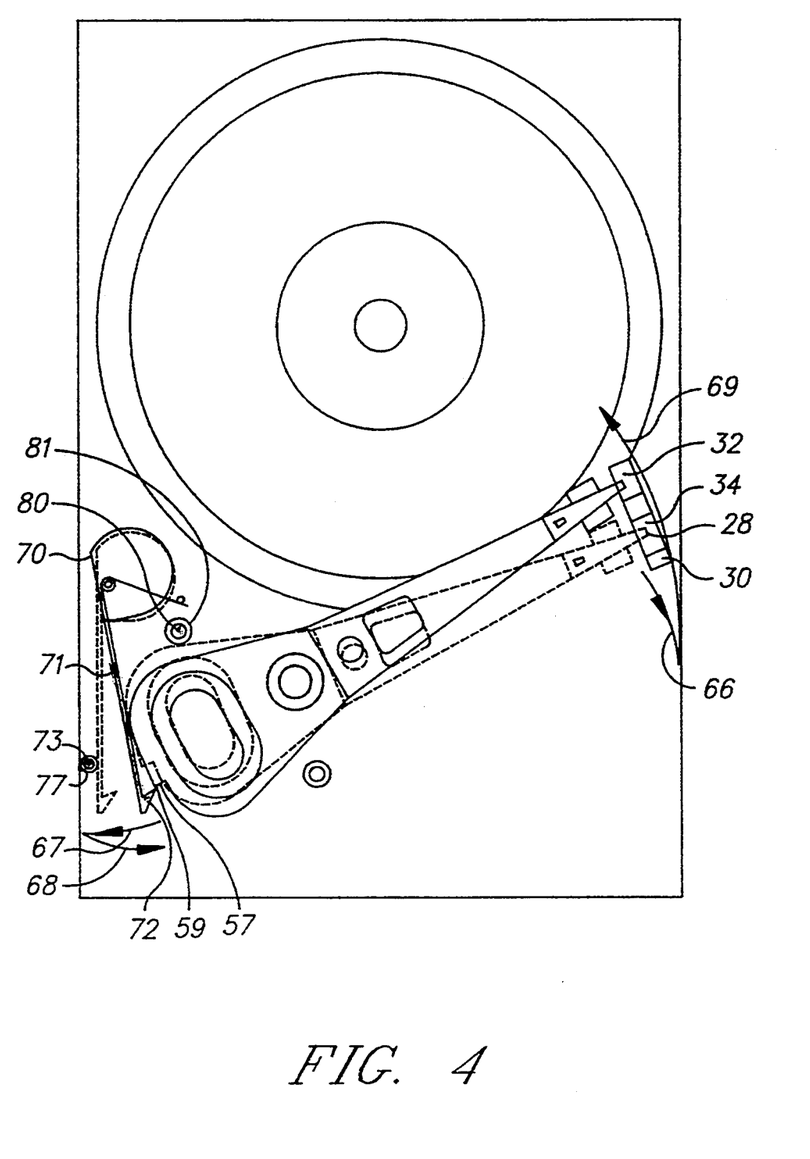
FIG. 4 is an illustration of a disk drive with the rotary inertial lock of the present invention shown rebounding (dashed lines) to lock the actuator following its rebound (dashed lines).

In the present invention, a bidirectional rotary inertial lock engages the actuator regardless of the direction of the external force. The preferred embodiment of the lock 70 is shown in FIG. 4. The latch arm 71 is made flexible and/or the latch stop 73 is made of elastic material. By appropriate design and selection of materials for the latch arm 71, latch stop 73, and crash stop 80 with O-ring 81, the damping and elasticity of the latch arm/latch stop system and crash stop system can be tailored to cause the latch tip 72 to intercept the mating surface 57 of actuator 14 both directly and on the rebound from crash stop 80.

In the embodiment of FIG. 4, the arm 71 is made of polyimide elastic material and is designed to a specified thickness so that it essentially forms a cantilever spring. In addition, or alternatively, latch stop 73 may also be made elastic by use of an O-ring 77 in a manner similar to the actuator crash stop. When the drive undergoes a counterclockwise acceleration so that the actuator 14 is driven in the direction of arrow 66 into its crash stop 80 (as shown by the dashed line outline of actuator 14), both the actuator 14 and the latch arm 71 rebound off their respective stops 80, 73. The latch arm 71 is driven in the direction of arrow 67 into its elastic crash stop 73 (as shown by the dashed line outline of inertial lock 70) and rebounds in the direction indicated by arrow 68 to the engagement point 59 before the mating surface 57 of actuator 14. The result is that even though the external torque is in a direction not generally considered to be a problem, i.e., in a direction that drives the actuator 14 into the crash stop 80, the unexpected rebound of the actuator 14 in the direction indicated by arrow 69 does not result in the slider 22 contacting or impacting the data region 13 of the disk 12. The lock 70 still functions in the normal manner in the presence of an external torque tending to cause the actuator 14 to move directly away from crash stop 80.

For the latch arm 71 to successfully intercept the actuator, the arm 71 must rotate far enough to engage the actuator before the actuator escapes, i.e., the mating surface 57 on the actuator 14 must not progress counterclockwise beyond the engagement point 59 before the latch tip 72 reaches point 59. The dynamic responses of the actuator 14 and rotary lock 70 in the presence of a clockwise rotational acceleration of the disk drive (one that tends to rotate the actuator 14 and latch arm 71 in the direction of arrows 66, 67, respectively) are controlled by certain properties of the actuator and latch systems. For the purpose of this explanation, let $I_A$ and $I_L$ be the rotational inertias of the actuator 14 and lock 70, respectively; $K_A$ and $K_L$ the torsional stiffnesses of the actuator/crash stop and latch arm/latch stop systems, respectively; and $Q_A$ and $Q_L$ the angles through which the actuator 14 and latch arm 71 must travel from their rest positions to reach the engagement point 59. For the case of a counterclockwise rotational acceleration of the disk drive which is a short duration pulse, both the latch arm 71 and actuator 14 will suddenly start rotating clockwise with respect to the drive, pushing each against its respective stop, and causing each to later bounce off their stops. During the time that each is against its stop, each system can be described as a torsional harmonic oscillator, and the bounces can be described as a single half cycle of the oscillator. The actuator/crash stop and latch arm/latch stop systems have characteristic frequencies $W_A$ and $W_L$, respectively, given by the following equations:

$$W_A = \sqrt{\frac{K_A}{I_A}} \quad (1)$$

$$W_L = \sqrt{\frac{K_L}{I_L}} \quad (2)$$

The time duration of a half cycle (the total bounce time) for each system is given by $\pi/W_A$ and $\pi/W_L$. The additional time needed to reach the engagement point 59 after rebounding from the stop is given by $Q_A/\alpha T$ and $Q_L/\alpha T$ seconds, where $\alpha$ is the magnitude of the rotational acceleration, and T is the duration of the acceleration. Thus, after completion of each bounce (that is, the moment the actuator 14 and latch arm 71 become free of their respective stops), the time needed for the actuator 14 and latch arm 71 to travel to engagement point 59 is inversely proportional to the angle through which they must travel to reach point 59 from the rest position. Thus, for short duration acceleration pulses (i.e., a small fraction of the half cycle or total bounce time of the faster reacting of the actuator and latch systems), successful latching requires the following relationship to hold:

$$\pi/W_A + Q_A/\alpha T > \pi/W_L + Q_L/\alpha T \quad (3)$$

The above analysis neglects the effects of damping in each system. The behavior of such elastic systems in the presence of damping is well understood. However, in summary, the effect of damping on each system is to slow it down; the characteristic frequency of a damped system falls with increasing damping, and the exit velocity after the bounce also decreases with increasing damping. Both such effects of damping increase the time needed to reach the engagement point 59. When the damping of either system reaches or exceeds the well-known criteria of "critical damping", there will be no bounce off the stops at all. Actuator/crash stop systems are typically underdamped, i.e., able to bounce. For such systems, the latch also must be able to bounce in order to intercept the actuator.

For accelerations which are longer than the short pulses described above, the dynamic analysis is more complicated. In such cases, the escape velocity upon completion of the bounce changes, depending on the duration and magnitude of the acceleration. Under some circumstances, the escape velocity for one system or the other may be very low or zero. If the latch arm angular velocity is too slow compared to the actuator angular velocity, latch failure may result. If the actuator and latch characteristic frequencies $W_A$ and $W_L$ are matched, however, then the escape velocities for each system remain equal to each other (even though both vary depending on the nature of the acceleration), and the bounce times for both systems are identical. Then, the condition for successful latching reduces to $Q_A > Q_L$.

Successful bounce latching for the rotary lock as described and shown in FIG. 4 has been demonstrated on a disk drive with the following parameters:

$I_A = 7$ gm-cm  $I_L = 0.5$ gm-cm $K_A = 1 \times 10^7$ dyne-cm/rad  $K_L = 7.7 \times 10^5$ dyne-cm/rad $W_A = 1200$ rad/sec  $W_L = 1200$ rad/sec $Q_A = 1.2$ deg  $Q_L = 0.8$ deg The elastic element in the actuator/crash stop system was a rubber O-ring 81, and the elastic element in the latch arm/latch stop system was a flexible latch arm 71 (FIG. 4). The latch arm 71 is viewed as a cantilever beam with dimensions 2.5 cm long × 0.1 cm thick × 0.25 cm wide. The rotary lock 70, $3.1 \times 10^{10}$ dyne/cm². Since $K_L$ is calculated from the beam dimensions and including the arm 71, was made of polyimide with a modulus of elasticity of modulus of elasticity according to the known relationship for cantilever beams, the selection of the beam material and dimensions results in matched characteristic frequencies $W_A$ and $W_L$. For arbitrary rotational accelerations in arbitrary directions and with arbitrary durations, the failure rate of this rotary lock was observed to be less than 1%.

A similar system with a thicker cantilever on the latch (0.25 cm thick) was observed to fail about 10% of the time under similar shock conditions. When counterclockwise shocks above a certain threshold were specifically applied to this system, the failure rate reached 100%. For the thicker cantilever, two unfavorable results occur: the frequencies $W_A$ and $W_L$ are no longer matched and, more importantly, the physical properties of the latch are such that the system is overdamped and does not bounce at all. Thus, the latch tip fails to engage the actuator at all in the case of counterclockwise rotational accelerations of the file. This overdamped case is typical of prior art inertial rotary locks; they do not bounce appreciably and are unable to capture a bouncing actuator.

Figure 5:
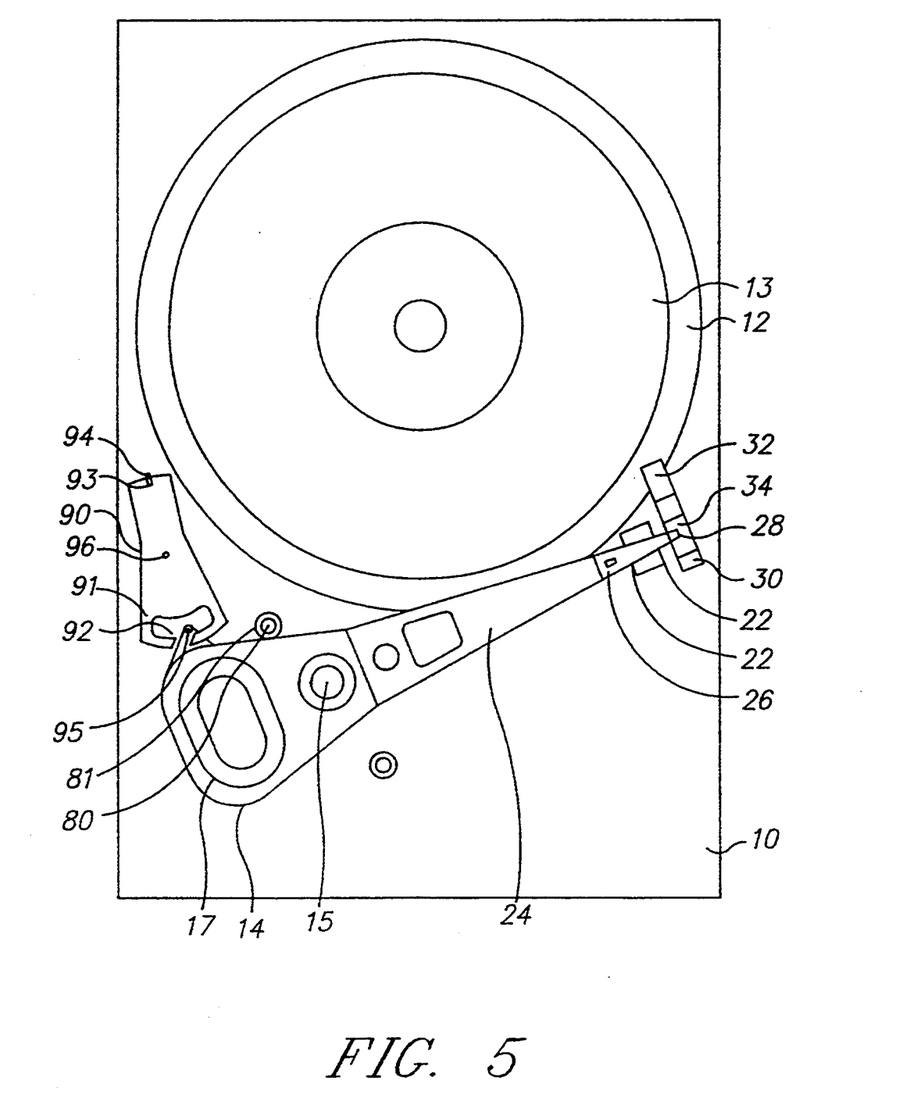
FIG. 5 is an illustration of a disk drive with an alternative embodiment of the rotary inertial lock of the present invention in the open position.
Figure 6:
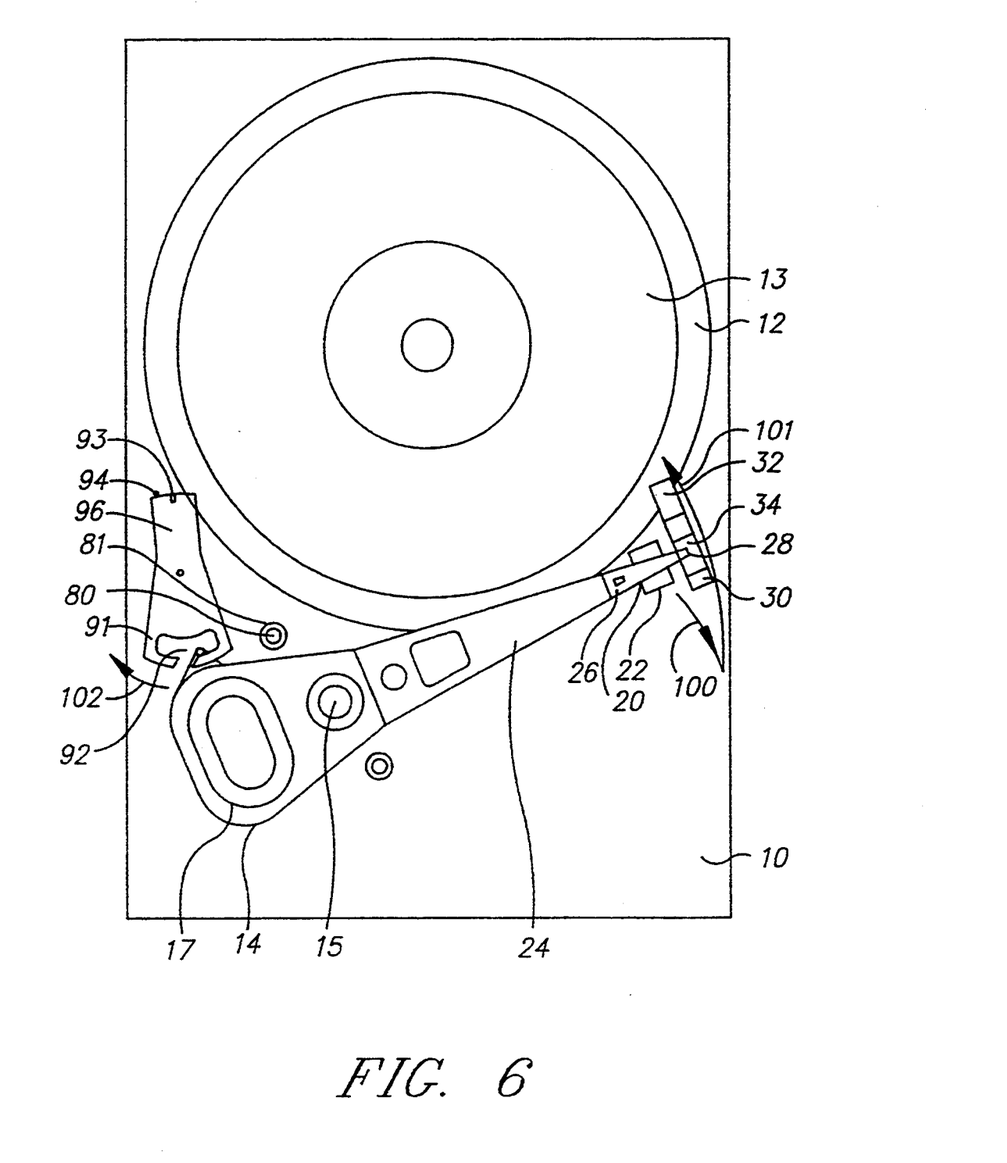
FIG. 6 is an illustration of a disk drive with an alternative embodiment of the rotary inertial lock of the present invention in the locked position.

An alternative embodiment of the bidirectional rotary inertial lock is shown in FIGS. 5 and 6. This bidirectional lock 90 is capable of rotating in both directions about a pivot 96. Lock 90 has an end 91 with a slot 92. On the opposite end, the lock 90 has a magnet 93. A ferromagnetic post 94 is mounted on base 10. The actuator 14 has a pin 95 in place of the mating surface 57 present in the FIG. 3 embodiment. In the absence of an external force, the lock 90 will be maintained in a neutral position with the magnet 93 aligned with ferromagnetic post 94. In this open position, the actuator engagement pin 95, which is rigidly attached to the actuator 14, can pass freely through the escape slot 92 on the lock end 91. This allows the actuator to freely rotate and move the slider 22 across the data region 13 of disk 12. However, in the event of a rotational acceleration of the drive in either a clockwise or counterclockwise direction, the lock end 91 will swing away from its open neutral position, capturing the actuator 14 in its parked position. If the total angle through which the lock end 91 can swing is large compared to the angle of the escape slot opening, the failure rate due to actuator rebound or random bouncing can be minimized. In the locked position shown in FIG. 6, the lock end 91 has rotated approximately 10 degrees, with plenty of room to spare, while the actuator 14 has been locked within a range of rotation of only a few degrees. Thus, in the time it takes for the actuator 14 to rotate into crash stop 80 (in the direction of arrow 100), rebound off crash step 80, and attempt to travel toward the data region 13 on disk 12 (in the direction of arrow 101), the lock end 91 is free to continue swinging further closed (in the direction indicated by arrow 102).

While the magnet 93 and post 94 are the preferred means for maintaining the lock 90 in its neutral position, a torsion spring could be used instead.

While the preferred embodiments of the present invention have been illustrated in detail, it should be apparent that modifications and improvements may be made to the invention without departing from the spirit and scope of the invention as described in the following claims.

What is claimed is:

1. A data recording disk drive comprising:

a disk having a data region;

a motor connected to the disk for rotating the disk;

a transducer for writing data to or reading data from the data region of the disk;

a carrier supporting the transducer;

a rotary actuator having a pivot and connected to the carrier for moving the carrier generally radially across the disk, the actuator being parked away from the disk data region when the disk is not rotating;

a crash stop for limiting the rotation of the actuator when the actuator is parked;

a rotary lock having a latch arm rotatable about an axis generally parallel to the actuator pivot for engaging the actuator and a latch stop for limiting the rotation of the latch arm in one direction, the latch arm being biased against the latch stop and rotatable away from the latch stop to engage the actuator in response to a first external force tending to rotate the actuator in a first direction away from the crash stop and toward the disk data region and the latch arm away from the latch stop, the latch arm and latch stop being sufficiently resilient to rebound the latch arm off the latch stop to engage the actuator on the rebound from its crash stop in response to the cessation of a second external force tending to rotate the actuator in a second direction into the crash stop and the latch arm into the latch stop; and means for supporting the motor, rotary actuator and rotary lock.

2. The disk drive according to claim 1 wherein the latch arm is flexible and the latch stop essentially rigid.

3. The disk drive according to claim 1 wherein the latch arm is essentially rigid and the latch stop is resilient.

4. The disk drive according to claim 1 wherein the latch has a tip for engaging the actuator and the rotary actuator has a surface for engaging the latch tip, wherein the rotary actuator and crash stop have a characteristic frequency generally equal to the characteristic frequency of the latch arm and latch stop, and wherein the angle of rotation for the actuator from its crash stop to engage the tip of the latch arm is greater than the angle of rotation for the latch arm from the latch stop to the engagement surface of the actuator.

5. The disk drive according to claim 1 further comprising a load/unload ramp mounted to the actuator supporting means for parking the carrier when the disk is not rotating.

6. The disk drive according to claim 1 further comprising a carrier landing zone located on the disk surface away from the data region for parking the carrier when the disk is not rotating.

7. A magnetic recording disk drive of the type having a latchable head actuator comprising:

a support base;

a magnetic recording disk having a region for the recording of data;

a motor mounted to the base and connected to the disk for rotating the disk;

a head for writing data to or reading data from the disk;

a carrier for supporting the head;

a rotary actuator mounted to the base and connected to the carrier for moving the carrier generally radially across the disk, the actuator having a mating surface, the mating surface defining a first path during rotation of the actuator;

a crash stop mounted to the base for limiting the rotation of the actuator;

a load/unload ramp mounted to the base for parking the carrier when the disk is not rotating; and a resilient rotary latch mounted to the base, the latch comprising (a) a latch arm rotatable about an axis generally parallel to the actuator rotation axis and having a tip for engaging the actuator mating surface, the tip defining a second path during rotation of the latch arm, the intersection of said first and second paths defining an engagement point, (b) a latch stop mounted to the base for limiting movement of the latch arm in the presence of an external force tending to rotate the actuator into the crash stop, and (c) a spring for biasing the latch arm against the latch stop, the rotary latch having a resilience sufficient to rebound the latch arm tip to the engagement point before the actuator mating surface reaches the engagement point when an external force tending to rotate the actuator into the crash stop ceases.

8. The disk drive according to claim 7 wherein the latch arm is flexible
and the latch stop is essentially rigid in the presence of an external force tending to rotate the flexible arm into the essentially rigid latch stop, whereby when said force ceases the flexible arm rebounds the arm tip to the engagement point.

9. The disk drive according to claim 7 wherein the arm is essentially rigid
and the latch stop is resilient in the presence of an external force tending to rotate the essentially rigid latch arm into the resilient latch stop, whereby when said external force ceases the resilient latch stop rebounds the arm to the engagement point.

10. The disk drive according to claim 7 wherein the rotary actuator and crash stop have a characteristic frequency generally equal to the characteristic frequency of the latch arm and latch stop, and wherein the angle of rotation for the actuator from the crash stop to the engagement point is greater than the angle of rotation for the latch arm from the latch stop to the engagement point.

* * * * *